US010217482B2

(12) United States Patent
Sankar et al.

(10) Patent No.: US 10,217,482 B2
(45) Date of Patent: *Feb. 26, 2019

(54) DEVICES INCLUDING A NEAR FIELD TRANSDUCER AND AT LEAST ONE ASSOCIATED ADHESION LAYER

(71) Applicant: SEAGATE TECHNOLOGY LLC, Cupertino, CA (US)

(72) Inventors: Vijay Karthik Sankar, Edina, MN (US); Tong Zhao, Eden Prairie, MN (US); Yongjun Zhao, Eden Prairie, MN (US); Michael C. Kautzky, Eagan, MN (US); Hui Brickner, Savage, MN (US); Sarbeswar Sahoo, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,040

(22) Filed: May 26, 2017

(65) Prior Publication Data

US 2017/0263276 A1 Sep. 14, 2017

Related U.S. Application Data

(63) Continuation of application No. 14/720,901, filed on May 25, 2015, now Pat. No. 9,666,220.

(Continued)

(51) Int. Cl.
*G11B 5/40* (2006.01)
*G11B 5/31* (2006.01)
(Continued)

(52) U.S. Cl.
CPC ............ *G11B 5/6088* (2013.01); *B05B 1/36* (2013.01); *G11B 5/31* (2013.01); *G11B 5/313* (2013.01);
(Continued)

(58) Field of Classification Search
CPC ............ G11B 2005/0021; G11B 5/314; G11B 5/4866; G11B 5/6088; G11B 5/3106;
(Continued)

(56) References Cited

U.S. PATENT DOCUMENTS 6,144,098 A 11/2000 Iyer
7,773,330 B2 8/2010 Itagi
(Continued)

FOREIGN PATENT DOCUMENTS

EP 0580368 1/1994
JP 2011-008899 1/2011
(Continued)

OTHER PUBLICATIONS

PCT International Search Report and Written Opinion for PCT/US2016/034628 dated Aug. 24, 2016 (14 pages).
(Continued)

*Primary Examiner* — Dionne H Pendleton
(74) *Attorney, Agent, or Firm* — Mueting, Raasch & Gebhardt, P.A.

(57) ABSTRACT

Devices that include a near field transducer (NFT), the NFT having a disc and a peg, and the peg having five surfaces thereof; and at least one adhesion layer positioned on at least one of the five surfaces of the peg, the adhesion layer including one or more of the following: yttrium (Y), tin (Sn), iron (Fe), copper (Cu), carbon (C), holmium (Ho), gallium (Ga), silver (Ag), ytterbium (Yb), chromium (Cr), tantalum (Ta), iridium (Ir), zirconium (Zr), yttrium (Y), scandium (Sc), cobalt (Co), silicon (Si), nickel (Ni), molybdenum (Mo), niobium (Nb), palladium (Pd), titanium (Ti), rhenium (Re), osmium (Os), platinum (Pt), aluminum (Al), ruthenium (Ru), rhodium (Rh), vanadium (V), germanium (Ge), tin (Sn), magnesium (Mg), iron (Fe), copper (Cu), tungsten (W), hafnium (Hf), carbon (C), boron (B), holmium (Ho), (Continued)

antimony (Sb), gallium (Ga), manganese (Mn), silver (Ag), indium (In), bismuth (Bi), zinc (Zn), ytterbium (Yb), and combinations thereof.

19 Claims, 14 Drawing Sheets

Related U.S. Application Data

(60) Provisional application No. 62/002,882, filed on May 25, 2014, provisional application No. 62/078,098, filed on Nov. 11, 2014.

(51) Int. Cl.
| | |
|---|---|
| *G11B 5/60* | (2006.01) |
| *G11B 7/24059* | (2013.01) |
| *G11B 5/84* | (2006.01) |
| *G11B 5/48* | (2006.01) |
| *B05B 1/36* | (2006.01) |
| *G11B 5/85* | (2006.01) |
| *G11B 5/00* | (2006.01) |

(52) U.S. Cl.
CPC ............ *G11B 5/314* (2013.01); *G11B 5/3116* (2013.01); *G11B 5/3163* (2013.01); *G11B 5/4866* (2013.01); *G11B 5/84* (2013.01); *G11B 5/85* (2013.01); *G11B 7/24059* (2013.01); *G11B 2005/0021* (2013.01)

(58) Field of Classification Search
CPC .. G11B 5/84; G11B 5/85; G11B 5/851; G11B 5/858; G11B 7/1387; G11B 5/40; G11B 13/08; G11B 5/3136; G11B 5/486; G11B 5/3133; G11B 5/3163; G11B 5/702; G11B 7/24; G11B 5/31; G11B 5/3116; G11B 5/313; G11B 7/24059; B05D 1/36
See application file for complete search history.

(56) References Cited

U.S. PATENT DOCUMENTS

| | | | |
|---|---|---|---|
| 8,040,761 B2 | 10/2011 | Kawamori | |
| 8,149,657 B2 | 4/2012 | Huang | |
| 8,248,897 B2 | 8/2012 | Shimazawa | |
| 8,339,740 B2 | 12/2012 | Zou | |
| 8,343,364 B1 | 1/2013 | Gao | |
| 8,351,151 B2 | 1/2013 | Katine | |
| 8,385,158 B1 | 2/2013 | Hu | |
| 8,400,902 B2 | 3/2013 | Huang | |
| 8,427,925 B2 | 4/2013 | Zhao | |
| 8,599,656 B2 | 12/2013 | Jin | |
| 8,773,956 B1 | 7/2014 | Wang | |
| 8,787,129 B1 | 7/2014 | Jin | |
| 8,790,527 B1 | 7/2014 | Luo | |
| 8,830,800 B1 | 9/2014 | Pitcher | |
| 8,842,391 B2 | 9/2014 | Zou | |
| 8,934,198 B2 | 1/2015 | Zou | |
| 8,958,271 B1 | 2/2015 | Peng | |
| 8,971,161 B2* | 3/2015 | Cheng | G11B 5/6088 369/13.33 |
| 8,976,634 B2 | 3/2015 | Cheng | |
| 9,058,824 B2 | 6/2015 | Cheng | |
| 9,129,620 B2 | 9/2015 | Cheng | |
| 9,263,074 B2 | 2/2016 | Huang | |
| 9,281,003 B2 | 3/2016 | Zhao | |
| 9,286,931 B2 | 3/2016 | Jayashankar | |
| 9,666,220 B2* | 5/2017 | Sankar | G11B 5/6088 |
| 2010/0104768 A1 | 4/2010 | Xiao | |
| 2010/0123965 A1 | 5/2010 | Lee | |
| 2010/0157745 A1 | 6/2010 | Okada | |
| 2010/0214685 A1 | 8/2010 | Seigler | |
| 2010/0321814 A1 | 12/2010 | Zou | |
| 2010/0329085 A1 | 12/2010 | Kawamori | |
| 2011/0002199 A1 | 1/2011 | Takayama | |
| 2011/0096431 A1 | 4/2011 | Hellwig | |
| 2011/0205863 A1 | 8/2011 | Zhao | |
| 2011/0205864 A1 | 8/2011 | Huang | |
| 2011/0209165 A1 | 8/2011 | Tsai | |
| 2012/0105996 A1 | 5/2012 | Katine | |
| 2012/0314549 A1 | 12/2012 | Lee | |
| 2013/0100783 A1 | 4/2013 | Ostrowski | |
| 2013/0107679 A1 | 5/2013 | Huang | |
| 2013/0148485 A1 | 6/2013 | Jin | |
| 2013/0170332 A1 | 7/2013 | Gao | |
| 2013/0235707 A1 | 9/2013 | Zhao | |
| 2013/0279315 A1 | 10/2013 | Zhao | |
| 2013/0288077 A1 | 10/2013 | Dhawam | |
| 2013/0330573 A1 | 12/2013 | Zhao | |
| 2014/0004384 A1 | 1/2014 | Zhao | |
| 2014/0251948 A1 | 9/2014 | Zhao | |
| 2014/0254335 A1 | 9/2014 | Gage | |
| 2014/0254336 A1 | 9/2014 | Jandric | |
| 2014/0307534 A1 | 10/2014 | Zhou | |
| 2014/0313872 A1 | 10/2014 | Rawat | |
| 2014/0376342 A1 | 12/2014 | Wessel | |
| 2014/0376349 A1 | 12/2014 | Cheng | |
| 2015/0043319 A1 | 2/2015 | Kasuya | |
| 2015/0063086 A1* | 3/2015 | Wierman | G11B 5/40 369/13.33 |
| 2015/0117170 A1 | 4/2015 | Zhao | |
| 2015/0179194 A1 | 6/2015 | Cheng | |
| 2015/0340052 A1 | 11/2015 | Sankar | |
| 2015/0380020 A1 | 12/2015 | Cheng | |
| 2016/0133291 A1 | 5/2016 | Chen | |
| 2016/0260448 A1 | 9/2016 | Zhao | |

FOREIGN PATENT DOCUMENTS

| | | |
|---|---|---|
| JP | 2013-122811 | 6/2013 |
| WO | WO 2013/163195 | 10/2013 |
| WO | WO 2013/163470 | 10/2013 |

OTHER PUBLICATIONS

PCT International Search Report and Written Opinion for PCT/US2016/034620 dated Aug. 18, 2016 (13 pages).

Sato et al., "Evaluation of Adhesion Materials for Gold Line-and-Space Surface Plasmon Antenna on SO1-MOS Photodiode", Silicon Nanoelectronics Workshop (SNW), 2010, IEEE, Piscataway, NJ, USA, Jun. 13, 2010, pp. 1-2.

Vogt, K.W. et al., "Characterization of Thin Titanium Oxide Adhesion Layers on Gold Resistivity, Morphology, and Composition", Surface Science, North-Holland, Amsterdam, NL, vol. 301, No. 1-3, Jan. 10, 1994, pp. 203-213.

Metallization: "Metallization"; chapter 5, In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.

* cited by examiner

DEVICES INCLUDING A NEAR FIELD TRANSDUCER AND AT LEAST ONE ASSOCIATED ADHESION LAYER

PRIORITY

This application claims priority to U.S. Provisional Application No. 62/002,882, entitled NEAR FIELD TRANSDUCERS WITH ADHESION LAYERS AND METHODS, filed on May 25, 2014, and Ser. No. 62/078,098 entitled NEAR FIELD TRANSDUCERS WITH ADHESION LAYERS AND METHODS, filed on Nov. 11, 2014, the disclosures of which are incorporated herein by reference thereto.

SUMMARY

Disclosed are devices that include a near field transducer (NFT), the NFT having a disc and a peg, and the peg having five surfaces thereof; and at least one adhesion layer positioned on at least one of the five surfaces of the peg, the adhesion layer including one or more of the following: yttrium (Y), tin (Sn), iron (Fe), copper (Cu), carbon (C), holmium (Ho), gallium (Ga), silver (Ag), ytterbium (Yb), or combinations thereof combinations thereof. and combinations thereof.

Also disclosed are devices that include an energy source; a near field transducer (NFT) configured to receive energy from the energy source, the NFT having a disc and a peg, and the peg having five surfaces thereof; and at least one adhesion layer positioned on at least one of the five surfaces of the peg, the adhesion layer including one or more of the following: and combinations thereof.

Also disclosed are devices that include an energy source; a near field transducer (NFT) configured to receive energy from the energy source, the NFT having a disc and a peg, and the peg having five surfaces thereof; and at least one adhesion layer positioned on at least one of the five surfaces of the peg, the adhesion layer having a thickness from about 10 Å to about 35 Å, and the adhesion layer including one or more of the following: chromium (Cr), tantalum (Ta), iridium (Ir), zirconium (Zr), yttrium (Y), scandium (Sc), cobalt (Co), silicon (Si), nickel (Ni), molybdenum (Mo), niobium (Nb), palladium (Pd), titanium (Ti), rhenium (Re), osmium (Os), platinum (Pt), aluminum (Al), ruthenium (Ru), rhodium (Rh), vanadium (V), germanium (Ge), tin (Sn), magnesium (Mg), iron (Fe), copper (Cu), tungsten (W), hafnium (Hf), carbon (C), boron (B), holmium (Ho), antimony (Sb), gallium (Ga), manganese (Mn), silver (Ag), indium (In), bismuth (Bi), zinc (Zn), ytterbium (Yb), or combinations thereof.

Also disclosed are near field transducers (NFT), the NFTs having a disc and a peg, and the peg having five surfaces thereof and a region that extends into the disc; and at least one adhesion layer positioned on at least four surfaces of the five surfaces of the peg, the adhesion layer including one or more of the following: yttrium (Y), tin (Sn), iron (Fe), copper (Cu), carbon (C), holmium (Ho), gallium (Ga), silver (Ag), ytterbium (Yb), or combinations thereof combinations thereof.

Also disclosed are methods forming a structure, the structure including a bottom adhesion layer; a peg and disc structure on the bottom adhesion layer, the peg and disc structure having both top surfaces and side surfaces; a second adhesion layer on the top and side surfaces of the peg and disc structure; a capping layer on the second adhesion layer; and an amorphous carbon layer on the capping layer; and removing at least a portion of the second adhesion layer via vertical ion milling and chemical mechanical polishing wherein the amorphous carbon layer functions as a stop layer for the second adhesion layer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
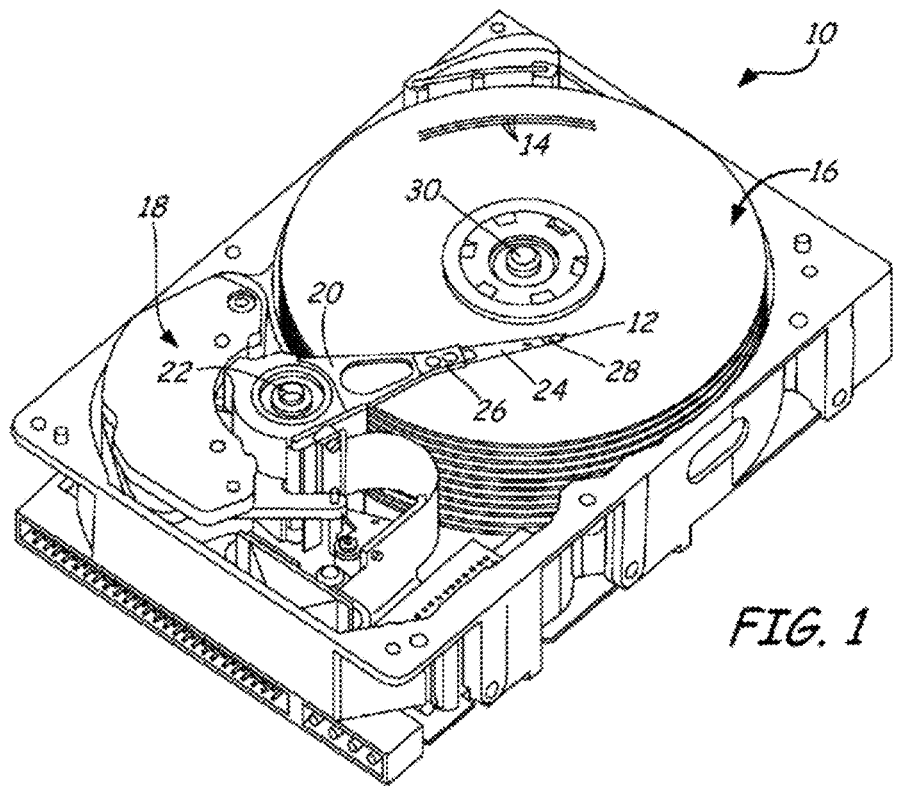
FIG. 1 is a perspective view of a magnetic disc drive that can include HAMR devices.

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more. The very high temperatures that are reached during operation can often lead to failure of the NFT and associate magnetic recording head.

A possible contributing factor to the failure of the NFT may be poor mechanical robustness and thermal stability of the NFT material, e.g., gold (Au). Gold has low hardness, grows grains easily and exhibits plastic reflow. One way to improve the mechanical robustness of gold (and other plasmonic material) is through doping. By adding another element into the Au, either embedded within grains or residing on Au grain boundaries, Au grains can be refined and stabilized. However such modifications to the plasmonic material will usually degrade the optical properties and thermal conductivity of Au. Thus a balance between improving mechanical strength and maintaining other physical and optical properties at acceptable levels is needed. As a result, the optimized doping level is typically very low, e.g. <1 at %. Such ultra-low doping levels can be realized either through co-sputtering from two targets or through sputtering from a single alloy target. Co-sputtering is not a preferred manufacturing approach due to the complexity in controlling the process. Also, such processes are limited by the mixing ratio between different elements due to the constraints on sputter power selection. In the single alloy target approach, the challenge lies in obtaining targets that produce repeatable doping levels, both within a target and from target to target. Therefore, there is a need to have a reliable and practically manufacturable way to realize ultra-low doping in films such as gold, if ultralow doping is to be utilized.

Another aspect of NFT failure is believed to be related to the interfacial characteristics at the NFT/cladding interface (e.g., Au/oxide interface). In current HAMR NFT designs, an Au NFT, for example, is surrounded by oxide cladding materials, e.g. $SiO_2$ or AlO for core-NFT spacer (CNS) and NFT-pole spacer (NPS). An Au/oxide interface is known to be a relatively weak interface. While Au has a higher surface energy (1.5 $J/m^2$), the typical optical cladding oxides used in HAMR have with much lower values, e.g. 0.2 $J/m^2$ for $SiO_2$ and 0.9 $J/m^2$ for AlO. Such a low surface energy, as well as a high interfacial energy between Au and the oxide, makes it energetically favorable for Au to detach from the surrounding oxides, which could lead to interfacial diffusion and peg deformation. Thus lowering the interfacial energy between Au and oxides may improve NFT stability.

Disclosed devices include one or more layers adjacent one or more surfaces of the peg of the NFT to increase or improve adhesion of the peg material to the surrounding materials or structures within the device. If the peg is better adhered to the surrounding materials or structures, it will be less likely to deform and/or recess, and materials from such an adhesion layer could also be designed to diffuse into the peg in order to dope the material of the peg.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
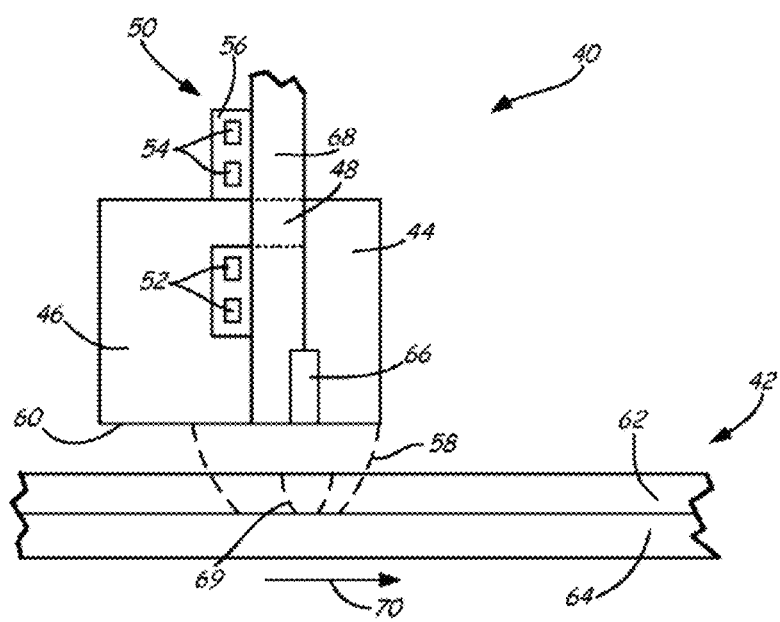
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIG. 1.

Figure 3A:
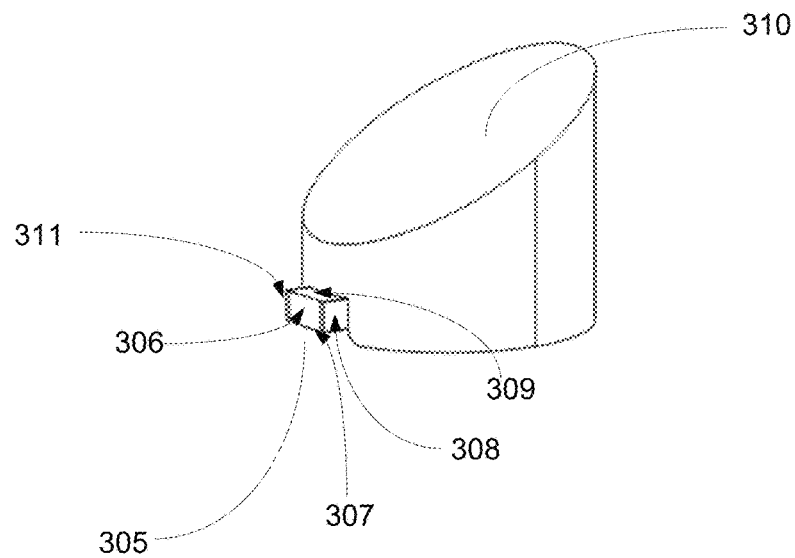
FIGS. 3A, 3B, and 3C are perspective views of an illustrative NFT (FIG. 3A) and the peg thereof (FIG. 3B), and a cross sectional view of (FIG. 3C) of the NFT and surrounding structures.
Figure 3B:
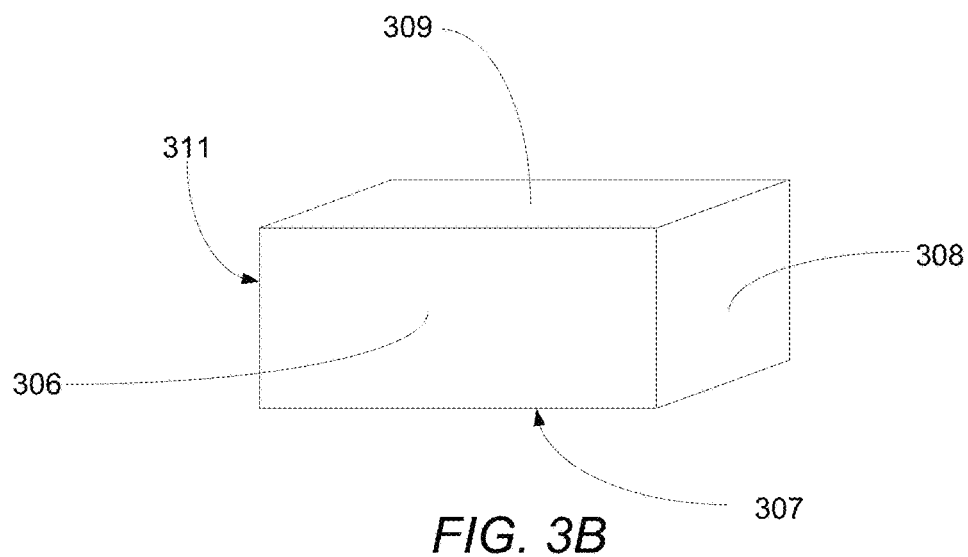

FIGS. 3A and 3B show an example of the peg and disc of a peg and disc type NFT, and FIG. 3B shows a closer view of only the peg of the peg and disc type NFT shown in FIG. 3A. The NFT in FIG. 3A includes a peg 305 and a disc 310. In some embodiments, the disc 310 can also include a portion that functions as a heat sink. In such embodiments, a bottom portion of the disc having substantially the same thickness as the peg can be considered the disc and the portion above that can be considered the heat sink. In some embodiments, the disc and the heat sink can be a single structure that was formed in the same step (or steps), and in some embodiments, the disc and heat sink can be formed separately (but of the same or a different material). The peg 305 shown in FIGS. 3A and 3B includes five surfaces that are not in contact with the disc 310, an air bearing surface 306, a first surface 307, a second surface 309, a third surface 308, and a fourth surface 311.

In some embodiments, the second surface 309 and the first surface 307 are facing the pole and core respectively. In some embodiments, the third surface 308 and the fourth surface 311 are not facing the pole or the core. More specifically, the third surface 308 would be located in front of the paper on which FIG. 2 is depicted and the fourth surface 311 would be located behind the paper on which FIG. 2 is depicted. In some embodiments, the second surface 309 can also be referred to as the NFT-pole surface which faces a NFT-pole space, which can be referred to as a NPS (not shown herein). In some embodiments, the first surface 307 can also be referred to as the NFT-core surface, which faces a NFT-core space, which can be referred to as CNS (not shown herein). In some embodiments, the third surface 308 can also be described as the surface which faces the left side of a device, in some embodiments; a left solid immersion mirror can be located there. In some embodiments, the fourth surface 311 can also be described as the surface which faces the right side of a device, in some embodiments; a right solid immersion mirror can be located there.

Figure 3C:
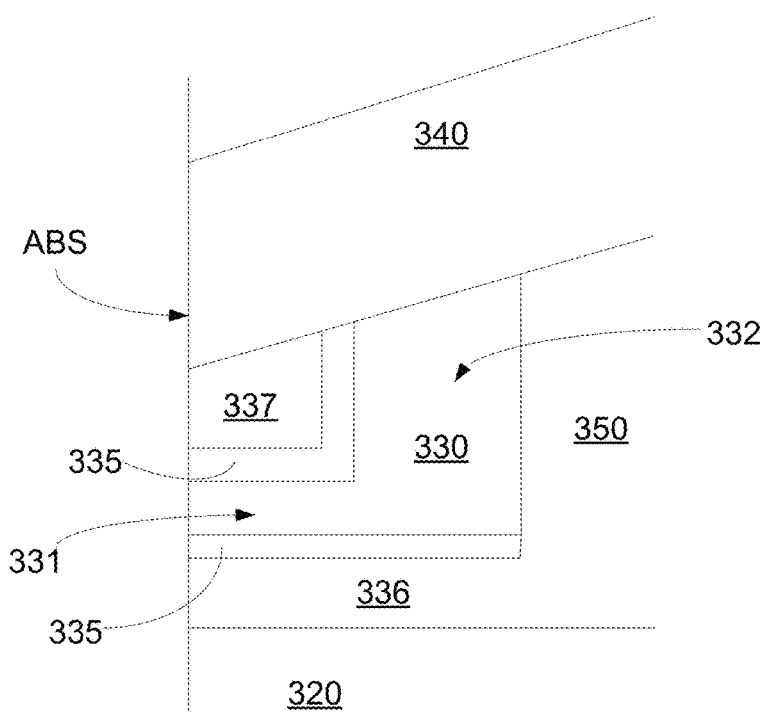

FIG. 3C shows a cross section of a device taken perpendicular to the air bearing surface (ABS). The device includes a write pole 340, a waveguide core 320, optical cladding 350 and a NFT 330. The portion of the cladding between the core 320 and the NFT 330 is depicted by numeral 336 and can be referred to as the core to NFT space, or CNS. The portion of the cladding between the pole 340 and the NFT 330 is depicted by numeral 337 and can be referred to as the pole to NFT space, or NPS. Between the NFT 330 and the optical cladding 350 is an illustrative adhesion layer 335. The embodiment depicted in FIG. 3C shows the adhesion layer 335 located around portions of the peg 331 and the disc 332. The adhesion layer 335 in FIG. 3C may be considered substantially the same as if it were on the first surface 307 of FIG. 3B. Similarly, the adhesion layer 337 in FIG. 3C may be considered substantially the same as if it were on at least the second surface 309 of the peg as well as on some portion of the surface of the disc 310 that faces the peg 305 (see FIG. 3A). The adhesion layer 337 in FIG. 3C may also be present on the third surface 308 and the fourth surface 311 (of FIG. 3B), but the particular cross section in FIG. 3C makes it impossible to know. In some embodiments, the adhesion layer 335 can be located on different surfaces of the NFT 330 than that shown in the cross section of FIG. 3C. One of skill in the art, having read this specification will understand that NFT types other than peg and disk (also referred to as "lollipop" type NFTs) could be utilized herein. For example plasmonic gap type NFTs and peg only NFTs can also be utilized.

Disclosed devices can include one or more adhesion layers located on one or more surfaces of a NFT. In some embodiments, disclosed devices can include one or more adhesion layers located on one or more surfaces of a peg of a NFT. In some embodiments, disclosed devices can include adhesion layers located on two or more surfaces of a peg of a NFT. In some embodiments, disclosed devices can include adhesion layers located on three or more surfaces of a peg of a NFT. In some embodiments, disclosed devices can include adhesion layers located on four or more surfaces of a peg of a NFT. In some embodiments, disclosed devices can include adhesion layers located on all five surfaces of a peg of a NFT. In some embodiments disclosed devices can include adhesion layers located on each of the first surface 307, the second surface 309, the third surface 308, and the fourth surface 311. Adhesion layers on different surfaces of the peg could have different materials. In some embodiments, the adhesion layer on one or more surfaces could be different in order to reduce the optical penalty.

The material of the adhesion layer can be selected based, at least in part on some of the following properties: good wettability on the NFT surface (e.g., a Au containing surface, in some more specific illustrative embodiments, a Au (111) surface); intermediate solubility with the NFT material and in some specific embodiments a negative heat of mixing with the NFT material; a relatively small mismatch (in some embodiments a negligible mismatch) between the layers of the adhesion layer material (e.g., metal layer) and the NFT material (e.g., Au, or more specifically in some embodiments Au (111)); a free energy of oxide formation of the material that is similar to or slightly less than the oxide of the cladding material; a high melting point; chemically stable with the NFT material without forming intermetallic materials; self-passivation with oxygen; or combinations thereof.

Figure 4:
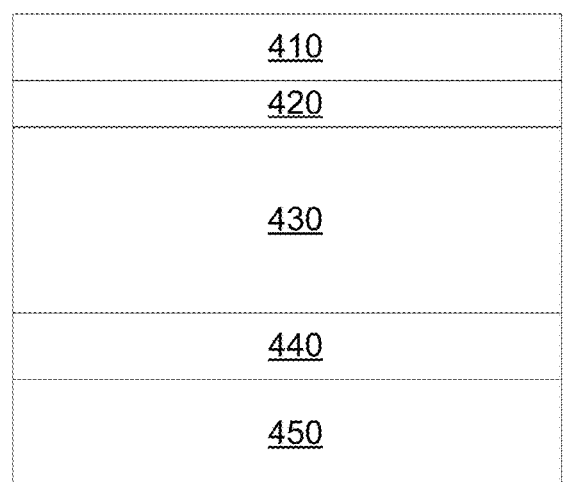
FIG. 4 shows a cross section of an illustrative portion of a structure that includes a disclosed adhesion layer.

Disclosed structures or layers can be generally described, irrespective of the larger structure they exist in, the shape and form of the structures or layers, or combinations thereof, by a stack structure. An example of such a stack structure is shown in FIG. 4. The structure in FIG. 4 shows the NFT 430, the NFT to pole space (NPS) 410, the core to NFT space (CNS) 450, an optional seed layer 440 and a disclosed adhesion layer 420. As seen in this illustration, the adhesion layer 420 is positioned between the NPS 410 which is a cladding material and the NFT 430.

As discussed above, both the NPS 410 and the CNS 450 generally include oxide materials. In some embodiments, the cladding material can include aluminum oxide (AlO), silicon oxide ($SiO_2$), yttrium oxide ($Y_2O_3$), magnesium fluoride ($MgF_2$), or combinations thereof for example. In some embodiments, the cladding layers, e.g., the NPS, the CNS, or both may have a thickness that is about 25 nanometers (nm). The optional seed layer can generally have a thickness that is not less than 5 Å but not greater than 10 Å. In some embodiments, the optional seed layer can include materials that may or may not be the same as those of the adhesion layer. In some embodiments, an optional seed layer that has the same materials as the adhesion layer, same thickness as the adhesion layer, or any combination thereof may be utilized. In some embodiments, an optional seed layer that has different materials than the adhesion layer, different thicknesses than the adhesion layer, or any combination thereof may be utilized.

The NFT 430 can include plasmonic materials. In some embodiments, various materials including, for example, gold (Au), silver (Ag), copper (Cu), alloys thereof, or other materials can be utilized to form a NFT. In some embodiments, the NFT can also be made of materials listed in U.S. Patent Publication No. 2013/0286799, U.S. Pat. No. 8,427,925, and U.S. patent application Ser. No. 13/923,925 entitled MAGNETIC DEVICES INCLUDING FILM STRUCTURES, filed on Jun. 21, 2013, and Ser. No. 14/062,651 entitled RECORDING HEADS INCLUDING NFT AND HEATSINK, filed on Oct. 24, 2013, the disclosures of which are incorporated herein by reference thereto.

In some embodiments, adhesion layers (located on one or more surfaces of a NFT, for example a peg of a NFT) can include one or more metals. In some embodiments, the metal can include specific illustrative metals such as for example yttrium (Y), tin (Sn), iron (Fe), copper (Cu), carbon (C), holmium (Ho), gallium (Ga), silver (Ag), ytterbium (Yb), or combinations thereof. In some embodiments, the metal can include specific illustrative metals such as for example Sn, Fe, Cu, Ga, Ag, or combinations thereof. In some embodiments, the metal can include specific illustrative metals such as for example Ho, Yb, or combinations thereof. In some embodiments, the metal can include specific illustrative metals such as for example Y. In some embodiments, the metal can include specific illustrative metals such as for example C.

In some embodiments, adhesion layers (located on one or more surfaces of a NFT, for example a peg of a NFT) can include one or more metals. In some embodiments, the metal can include specific illustrative metals such as for example chromium (Cr), tantalum (Ta), iridium (Ir), zirconium (Zr), yttrium (Y), scandium (Sc), cobalt (Co), silicon (Si), nickel (Ni), molybdenum (Mo), niobium (Nb), palladium (Pd), titanium (Ti), rhenium (Re), osmium (Os), platinum (Pt), aluminum (Al), ruthenium (Ru), rhodium (Rh), vanadium (V), germanium (Ge), tin (Sn), magnesium (Mg), iron (Fe), copper (Cu), tungsten (W), hafnium (Hf), carbon (C), boron (B), holmium (Ho), antimony (Sb), gallium (Ga), manganese (Mn), silver (Ag), indium (In), bismuth (Bi), zinc (Zn), ytterbium (Yb), or combinations thereof. In some embodiments, the metal can include specific illustrative metals such as for example Sc, Ti, V, Cr, Mn, Fe, Co, Ni, Cu, Zn, Y, Zr, Nb, Mo, Ru, Rh, Pd, Ag, Hf, Ta, W, Re, Os, Pt, Ir, or combinations thereof. In some embodiments, the metal can include specific illustrative metals such as for example B, Al, Ga, In, or combinations thereof. In some embodiments, the metal can include specific illustrative metals such as for example C, Si, Ge, Sn, or combinations thereof. In some embodiments, the metal can include specific illustrative metals such as for example Sb, Bi, or combinations thereof. In some embodiments, the metal can include specific illustrative metals such as for example Ho, Yb, or combinations thereof. In some embodiments, an adhesion layer can include alloys of the noted elements, including for example NiFe and TiW. It should also be noted that adhesion layers can include alloys that include one of the noted elements and an element not specifically called out herein.

Disclosed adhesion layers can have various thicknesses. The thickness of an adhesion layer can refer to the average thickness of the adhesion layer. In some embodiments, a disclosed adhesion layer can have a thickness that is at least 1 Å, in some embodiments at least 2 Å, or in some embodiments at least 10 Å. In some embodiments, a disclosed adhesion layer can have a thickness that is not greater than 60 Å, not greater than 50 Å, not greater than 35 Å, or even not greater than 30 Å. The thickness (e.g., the average thickness) of an adhesion layer can be measured using, for example, transmission electron microscopy (TEM), X-ray reflectivity (XRR), or x-ray photoelectron spectroscopy (XPS). The thickness can be determined using calibration from standard samples having known thicknesses, for example.

One of skill in the art, having read this specification will understand that NFT types other than peg and disk (also referred to as "lollipop" type NFTs) could be utilized herein. For example plasmonic gap type NFTs and peg only NFTs can also be utilized. In some embodiments, various materials including, for example, gold (Au), silver (Ag), copper (Cu), alloys thereof, or other materials can be utilized to form a NFT. In some embodiments, the NFT can also be made of materials listed in U.S. Patent Publication No. 2013/0286799, U.S. Pat. No. 8,427,925, and U.S. patent application Ser. No. 13/923,925 entitled MAGNETIC DEVICES INCLUDING FILM STRUCTURES, filed on Jun. 21, 2013, and Ser. No. 14/062,651 entitled RECORDING HEADS INCLUDING NFT AND HEATSINK, filed on Oct. 24, 2013, the disclosures of which are incorporated herein by reference thereto.

In some embodiments, materials that can be utilized for adhesion layers can be those that provide acceptable levels of NFT coupling efficiency loss. Such materials can generally have relatively high indices of refraction (n). The presence of a non-plasmonic material layer, e.g., a disclosed adhesion layer in some embodiments, at the interface of the NFT material and the cladding material layer can "dampen" the ability of that interface to support surface plasmons, which can result in weaker electric field emission from the NFT. Such materials may also have relatively favorable k values. In some embodiments, materials that are more highly detrimental from an optical standpoint can be utilized at relatively smaller thicknesses, for example.

Materials of the adhesion layer can also be designed to interact with the material of the NFT itself, for example a dopant in a primary material of the NFT, the primary material of the NFT, or a combination thereof. In some embodiments, a NFT is formed by the application of heat, e.g., annealing, to add one or more elements into a NFT made of a primary material. After annealing, the NFT material and one or more secondary elements mix together and the secondary element is uniformly doped in the material of the NFT (e.g., an Au film or layer). The heat treatment can be done at any of the following stages: 1) after deposition of the NFT and secondary element, before peg formation; 2) after the peg is formed, but before the adhesion layer and NPS is deposited; 3) after the top adhesion layer and NPS are deposited, but before a final air bearing surface (ABS) with a head overcoat is formed; or 4) after a final ABS with a head overcoat is formed. The heat treatment conditions can be chosen so that they are sufficient to drive the desired atom redistribution, but not harsh enough to cause Au grain growth and/or peg deformation. It should also be noted that the diffusion of the secondary atoms can react with the material of the adhesion layer to strengthen the interface and promote adhesion.

Methods of making devices including disclosed adhesion layers can vary depending on the location of the adhesion layer. In embodiments where one or more adhesion layers are being utilized on the first surface 307, the third surface 308, the fourth surface 311, or any combination thereof, the adhesion layer(s) can be deposited, then the NFT material can be deposited, followed by the cladding or dielectric material. The adhesion layer(s) then affects adhesion between the underlying dielectric material (for example the cladding layers or dielectric layers) and the NFT. In embodiments where an adhesion layer is utilized on the second surface 309, the adhesion layer material can be deposited on the NFT material after it is deposited, for example in a trench (either lined with a disclosed adhesion layer material or not). The adhesion layer on the second surface 309 then affects adhesion between the NFT material and the overlying dielectric material (for example the top cladding layer). In some embodiments, an adhesion layer material can be deposited on a NFT material layer. This structure can then be trimmed in order to form a peg (from the NFT material layer) with an adhesion layer on the first surface 307 of the peg. Next, an adhesion layer can be formed on the third surface 308, the fourth surface 311 and the second surface 309. Excess adhesion layer material can then optionally be removed from the structure.

FIGS. 5A through 5D depict an illustrative process sequence to form a device that includes disclosed adhesion layer. The device to be formed using this illustrative process includes adhesion layers on the bottom, the sides and the top of the peg and a portion of the disc. With respect to FIGS. 3A and 3B, the adhesion layer formed using such an illustrative process would be on the first surface 307, the second surface 309, the third surface 308 and the fourth surface 311 of the peg 305, as well as on the surface of the disc 310 facing the peg 305 (see FIG. 3A).

Figure 5A:
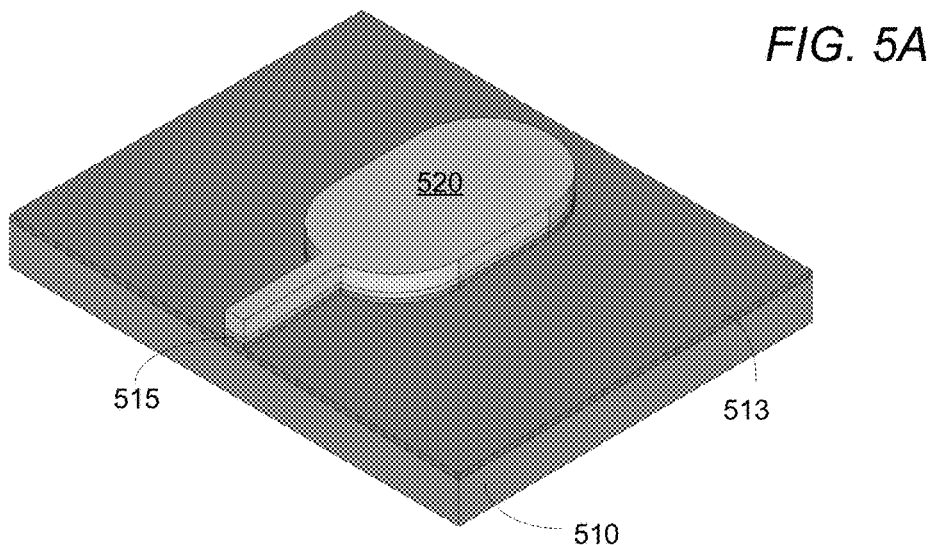
FIGS. 5A through 5D depict an illustrative process sequence to form a device that includes disclosed adhesion layer.
Figure 5B:
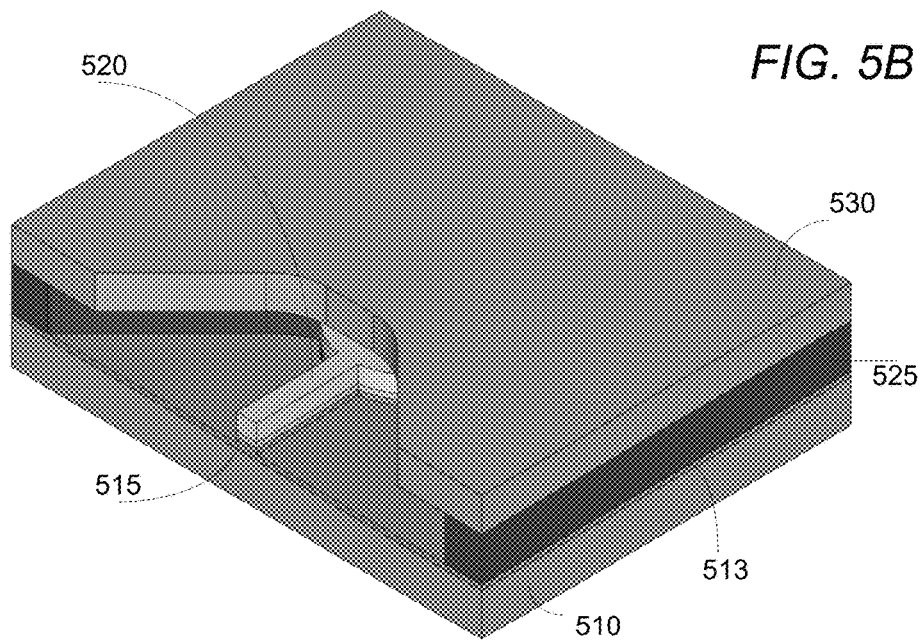
Figure 5C:
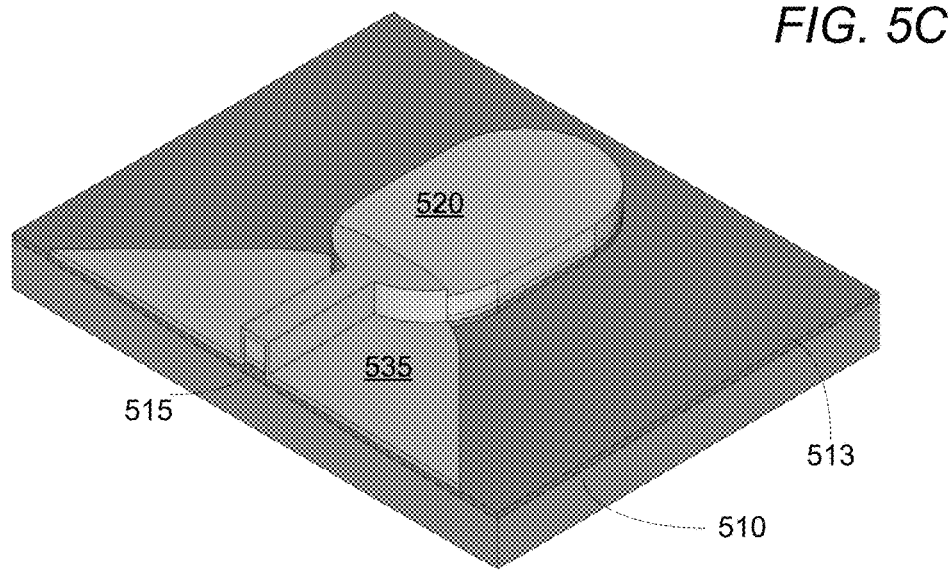
Figure 5D:
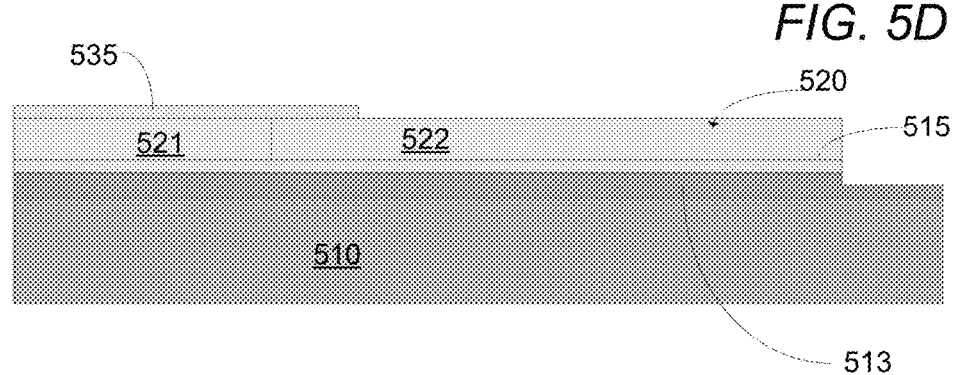

The illustrative process demonstrated in FIGS. 5A to 5D includes a one piece NFT, which implies that the disc and peg of the NFT are formed together in one ion mill process. FIG. 5A shows the core 510, the core/NFT space (CNS) 513 that is made of a cladding material, a first surface (or bottom) adhesion layer 515, and the already formed NFT 520. The NFT 520 can be formed, for example, with photolithography techniques including patterning photoresist and amorphous carbon hardmask for example. Once the photolithography techniques have been used to form the general structure, the NFT can be milled with a bit of overmill into the CNS to form the CNS 513 and NFT 520 seen in FIG. 5A. The amorphous carbon hard mask can be ashed away, for example in an O₂ plasma asher. FIG. 5B shows the structure after a non-optically sensitive material and photoresist material have been applied. The non-optically sensitive material is utilized to create an undercut during lithography. In some embodiments, the non-optically sensitive layer 525 can include polymethylglutarimide (PMGI) for example. The non-optically sensitive layer 525 and the photoresist layer 530 after being patterned to provide an undercut protects a majority of the disc area leaving only the peg area and a portion of the disc near the peg exposed. The structure in FIG. 5B therefore includes all of the previous components as well as a patterned photoresist layer 530 and an undercut non-optically sensitive layer 525. The first patterned photoresist 525 and the patterned photoresist 530 leave only the three surfaces (top and sides) of the peg and a portion of the disc facing the peg exposed. FIG. 5C shows the structure after an adhesion layer 535 has been deposited on the exposed surfaces of the peg and disc, and the first patterned photoresist 525 and the second patterned photoresist 530 have been removed with a liftoff process for example. FIG. 5D shows a cross section of the structure. The structure includes the core 510, the CNS 513, the bottom adhesion layer 515, the NFT 520 including the peg 521 and the disc 522, and the adhesion layer 535. As seen in FIG. 5D (and FIG. 5C), the adhesion layer 535 is disposed on at least a portion of the disc 522. Although not seen in FIG. 5D (but visible in FIG. 5C), the adhesion layer 535 is on both the top and the sides of the peg 521. It should be noted that the process flow depicted in FIGS. 5A to 5D is only an illustrative example of a process flow that could be utilized to form an adhesion layer on the bottom, top and sides of a peg as well as a portion of a disc.

Figure 6A:
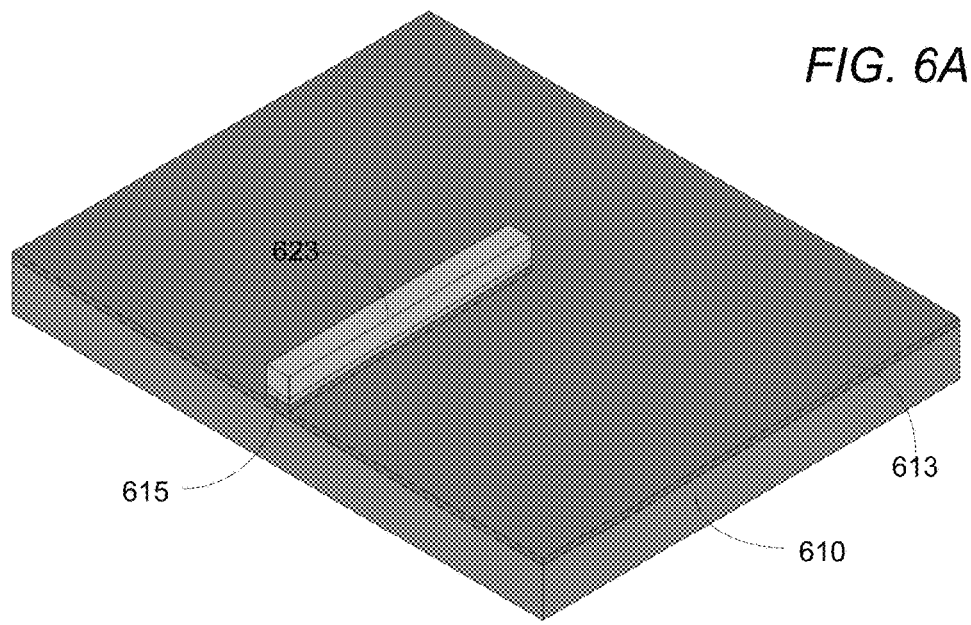
FIGS. 6A through 6D depict an illustrative process sequence to form a device that includes disclosed adhesion layer.
Figure 6B:
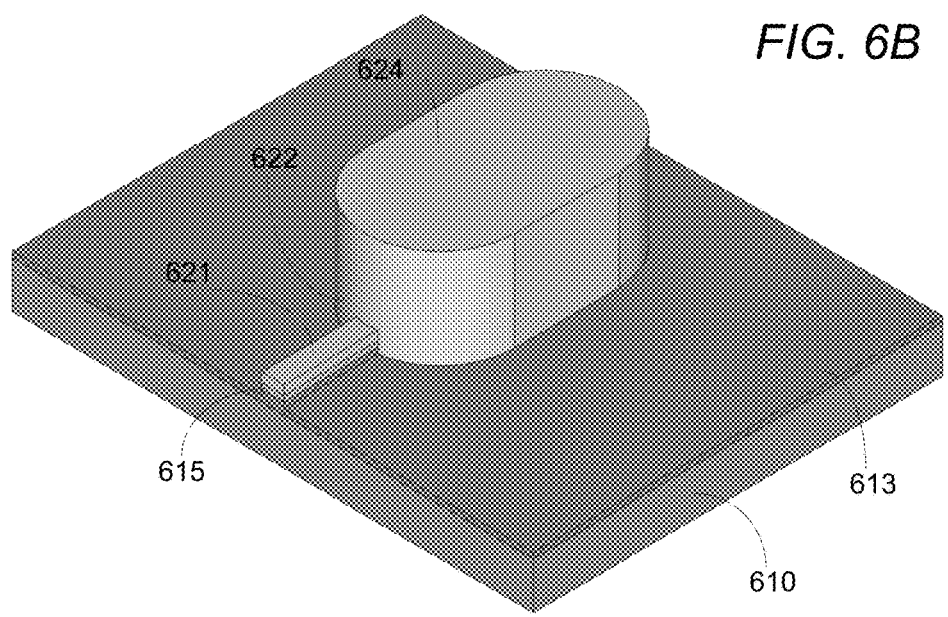
Figure 6C:
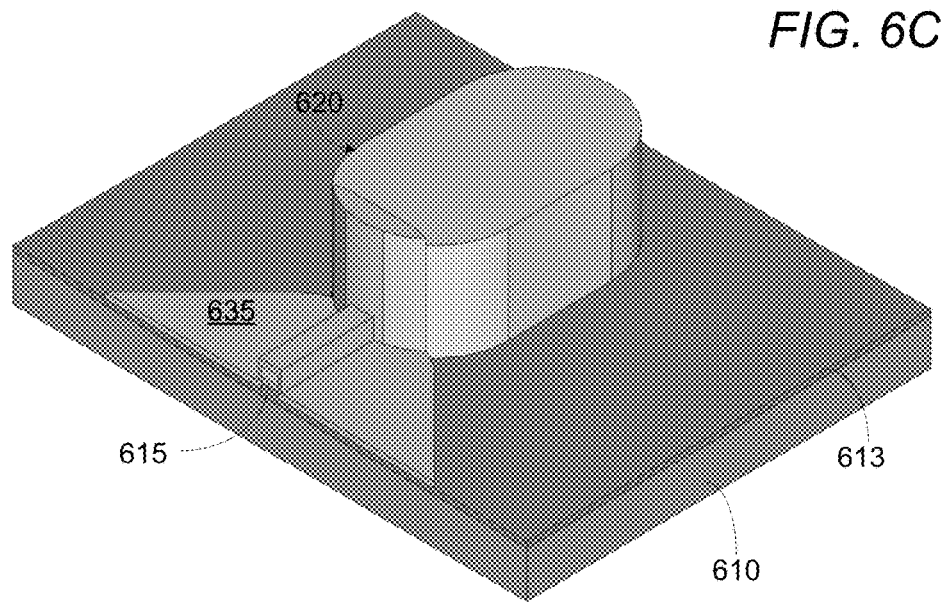
Figure 6D:
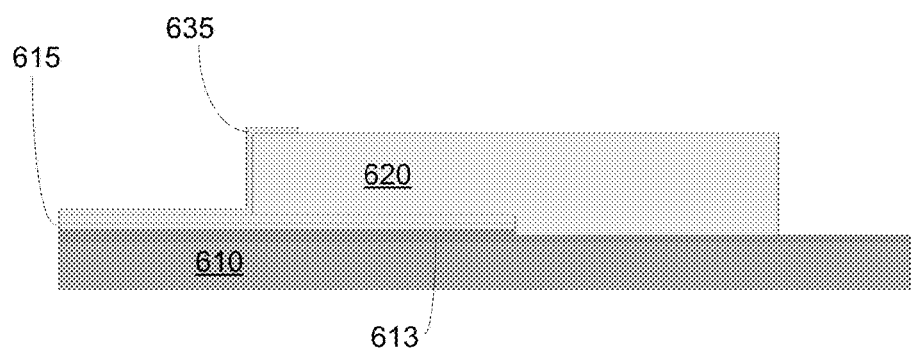

The illustrative process demonstrated in FIGS. 6A to 6D includes a two piece NFT, which implies that the disc and peg of the NFT are formed in different process steps. FIG. 6A shows the core 610, the core/NFT space (CNS) 613 that is made of a cladding material, a first surface (or bottom) adhesion layer 615, and a rod 623 that eventually becomes part of the NFT. The rod can be formed by depositing a layer of plasmonic material (e.g., gold), patterning the layer with amorphous carbon hardmask, for example, and then milling. After the milling step, the amorphous carbon hardmask can be ashed away. FIG. 6B shows the structure after the disc 622 and the heat sink 624 are formed over the rod to provide the peg 621 using a liftoff process. FIG. 6C shows the structure after an adhesion layer 635 is formed over the peg and at least a portion of the disc and heatsink of the NFT 620 (using the same liftoff process for example). FIG. 6D shows a cross section that includes the core 610, the CNS 613, the bottom adhesion layer 615, the peg 620 and the adhesion layer 635. Although not seen in FIG. 6D (but visible in FIG. 6C), the adhesion layer 635 is on both the top and the sides of the peg. It should be noted that the process flow depicted in FIGS. 6A to 6D is only an illustrative example of a process flow that could be utilized to form an adhesion layer on the bottom, top and sides of a peg as well as a portion of a disc.

In process flows such as those depicted via FIGS. 5A to 5D and 6A to 6D, the materials utilized in the adhesion layers (both bottom and top/sides) may optionally be chosen in such a way that after annealing secondary atoms in the main NFT material can diffuse into the NFT/CNS interfaces and react with adhesive material that is covering all the NFT/CNS interfaces without forming intermetallic compounds that destabilize the interface. The material choices of the secondary atoms in the NFT and the adhesion layer may be made by considering at least some of the following: 1) the secondary atom can have a positive heat of mixing with the main NFT material, whereas the adhesion layer material can have a slightly negative heat of mixing with the NFT material; 2) the secondary atom can react with the adhesion layer material to form an amorphous layer that has relatively high affinity to oxygen and the NFT material respectively; 3) the secondary atoms and the adhesion layer atoms may be chosen to restrict the NFT material (e.g., Au) grain growth during operation and both the secondary atom and the adhesion layer material may enable densification of the main NFT material; 4) the secondary atoms and the adhesion layer atoms may act as vacancy traps to reduce the peg recession; or some combination thereof. The adhesion layer material and NPS may, in some embodiments be deposited in-situ for improved adhesion integrity.

Some illustrative embodiments do not include adhesive materials beyond the sides of the peg (as compared with the extent of the adhesion layer 535 in FIG. 5C and adhesion layer 635 in FIG. 6C). Such embodiments may reduce the thermal and optical penalty of the adhesion layer material. The process flows in FIGS. 7A to 7G and 8A to 8F show process flows to obtain such an adhesion layer with a two piece NFT (FIGS. 7A to 7G) and a one piece NFT (FIGS. 8A to 8F).

Figure 7A:
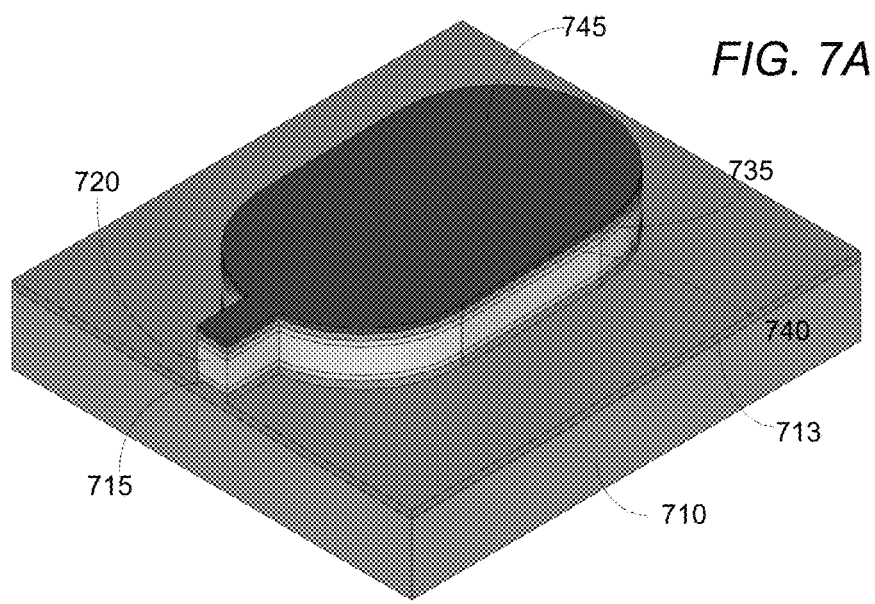
FIGS. 7A through 7G depict an illustrative process sequence to form a device that includes disclosed adhesion layer.
Figure 7B:
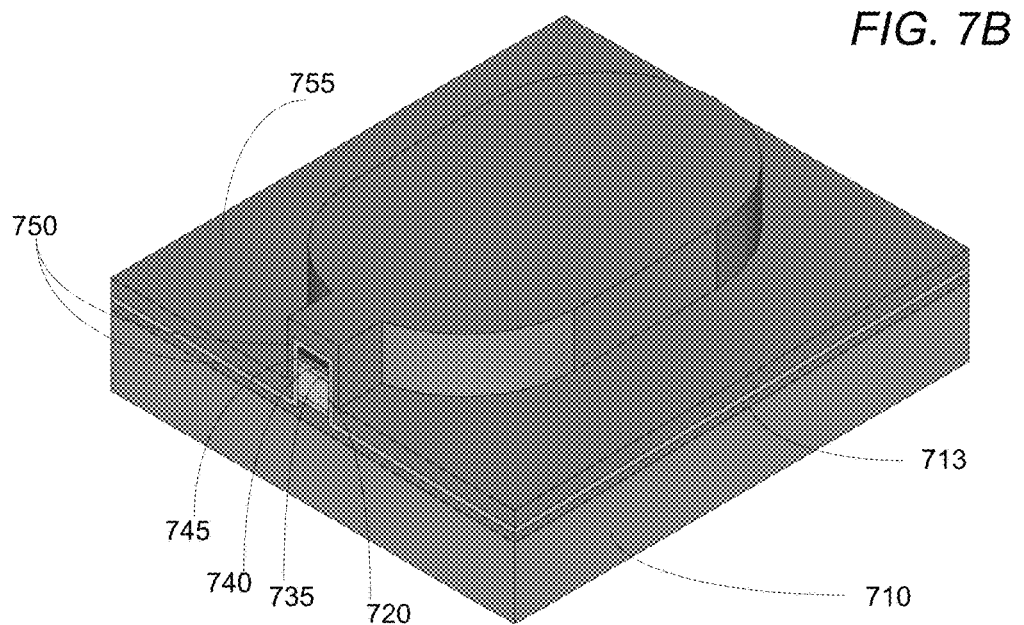

The illustrative process demonstrated in FIGS. 7A to 7D includes a one piece NFT, which implies that the disc and peg of the NFT are formed together in one ion mill process. In this illustrative process, a layer of adhesive layer material is deposited, then a layer of NFT material (e.g., gold) is deposited, then a second layer of adhesive material (either the same or different than the first) is deposited, and finally a capping layer is deposited (this process forms a non-patterned stack of adhesive layer material/NFT material/adhesive layer material/capping layer material on a structure that already included a core/CNS cladding layer structure). The capping layer can be any material that can protect the top adhesion layer material from being oxidized in air or during subsequent patterning steps. An illustrative material for the capping layer includes, for example AlO. This layered structure is subjected to ion milling via an amorphous carbon hardmask, for example, to form a NFT. This structure is shown in FIG. 7A and includes the core 710, the core/NFT space (CNS) 713 that is made of a cladding material, a first surface (or bottom) adhesion layer 715, NFT 720 and second (or top) adhesion layer 735, capping layer 740 and hardmask 745. As seen in FIG. 7B, the next step includes formation of an additional layer of adhesion material 750 and second capping layer 755 on top of the hardmask 745 so that the sides of the peg and disc are covered by adhesion layer material (the additional layer of adhesion material 750) and the adhesion layer 750 does not get damaged during subsequent processing (second capping layer 755).

Figure 7C:
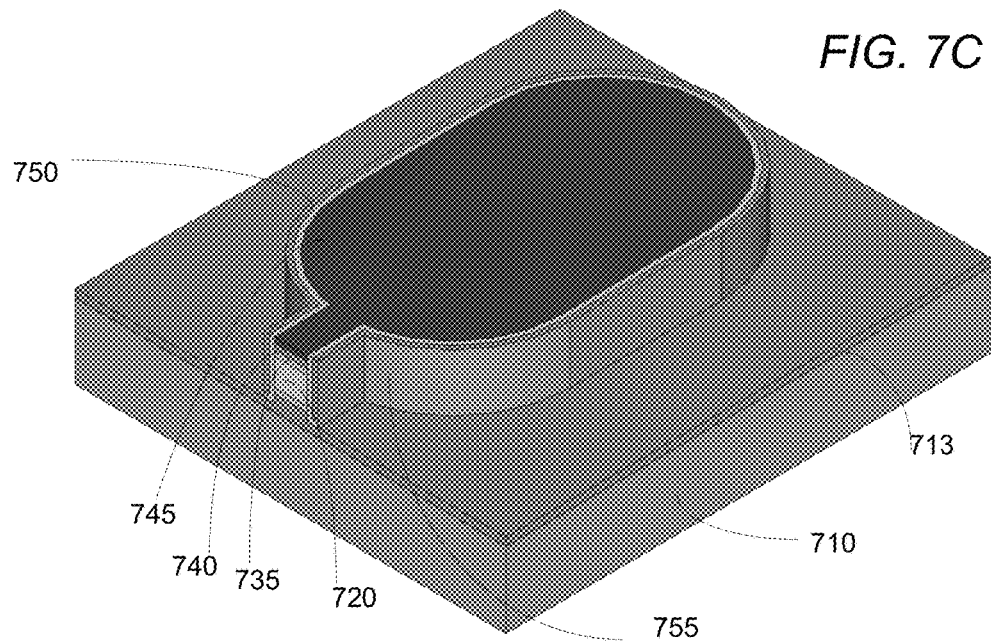
Figure 7D:
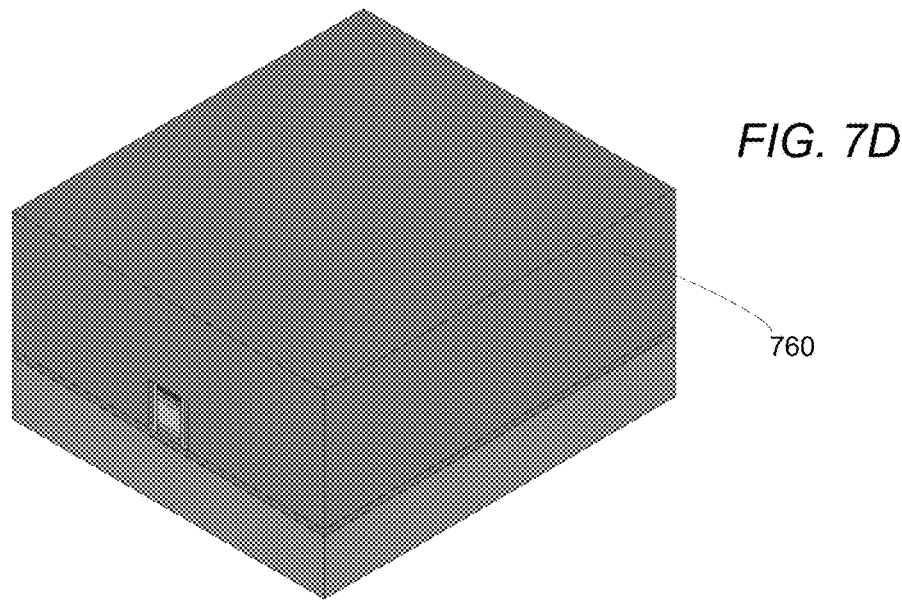
Figure 7E:
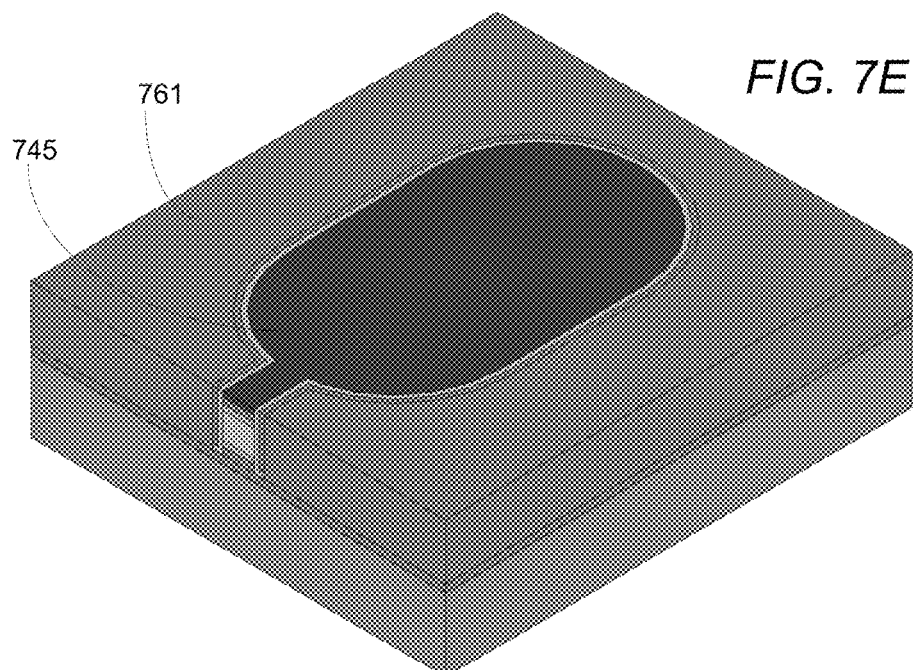
Figure 7F:
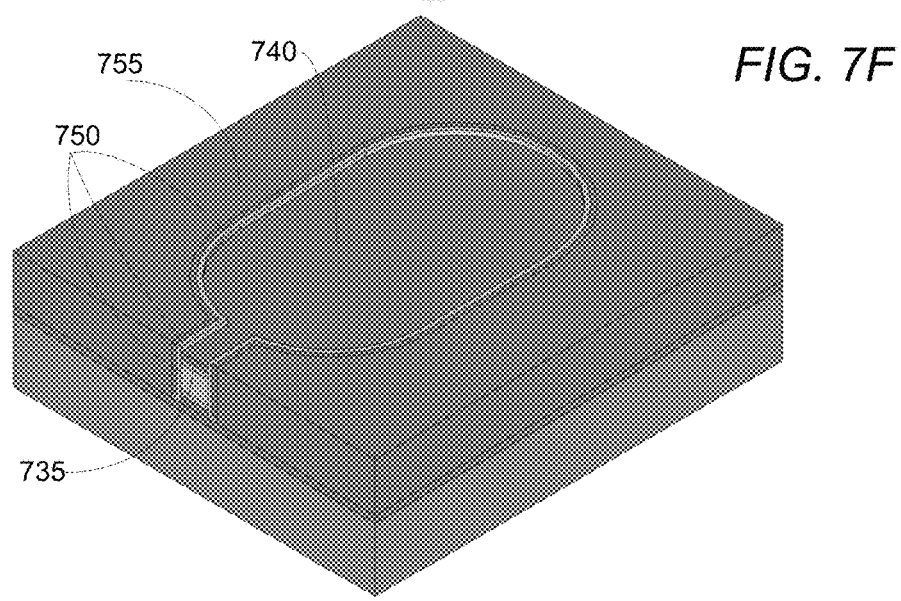
Figure 7G:
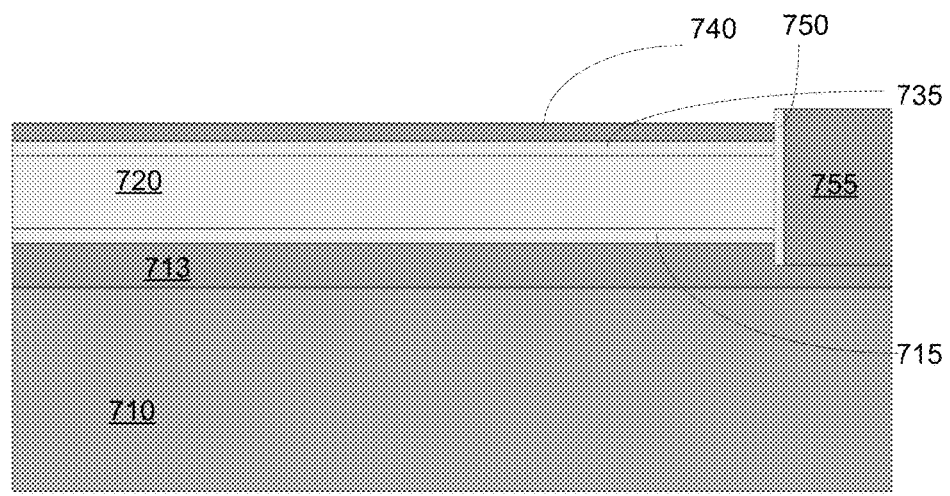

The next step includes top down vertical ion milling to remove the adhesion layer from the field. Upon completion of this step, the hardmask 745 (e.g., amorphous carbon) will be exposed, the structure after completion of this step is seen in FIG. 7C. Next, a cladding layer e.g., AlO, is deposited in the entirety of the field to backfill the area around the structure, this structure is seen in FIG. 7D, with the cladding layer 760 indicated therein. Next, a polishing step, e.g. chemical mechanical polishing (CMP) is undertaken that is configured to stop at the hardmask 745 layer. Amorphous carbon is a useful material for the hardmask 745 because it is a good CMP stop material, which will protect the top adhesion material layer from being polished away. This structure is depicted in FIG. 7E, with the backfill 761 and the hardmask 745 indicated therein. After that, the hardmask 745 is removed. In instances where the hardmask 745 was amorphous carbon, it can be removed by ashing, for example by ashing with $H_2$ plasma, which can avoid oxidizing the adhesion layer. The structure after this step is seen in FIG. 7F, with the adhesion layer formed by the additional layer of adhesion material 750 as indicated, the top adhesion layer 735, the second capping layer 750 and the capping layer 740. FIG. 7G shows a cross section. The structure includes the core 710, the core/NFT space (CNS) 713, a first surface (or bottom) adhesion layer 715, NFT 720 and second (or top) adhesion layer 735, capping layer 740, which can ultimately form part of the top cladding or NPS space (NPS), the back adhesion layer 750, and back cladding 755.

Figure 8A:
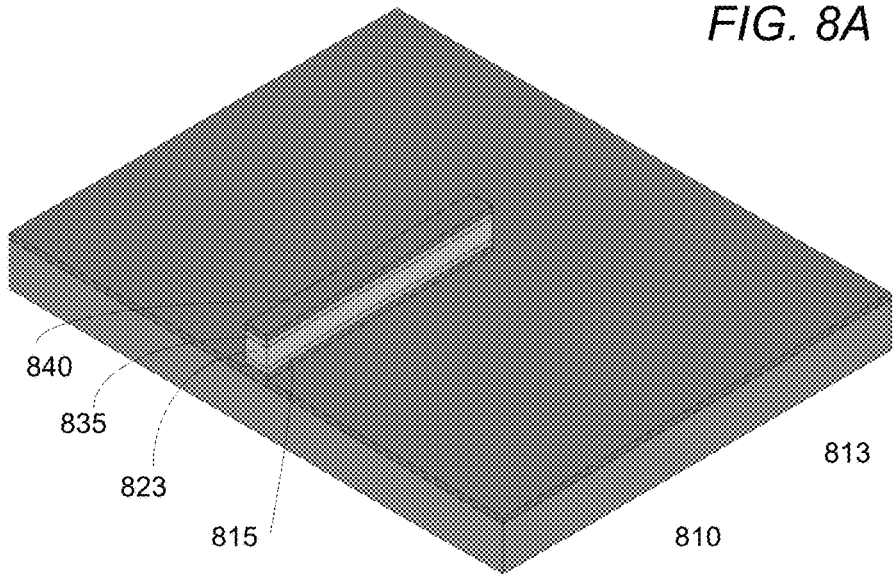
FIGS. 8A through 8F depict an illustrative process sequence to form a device that includes disclosed adhesion layer.
Figure 8B:
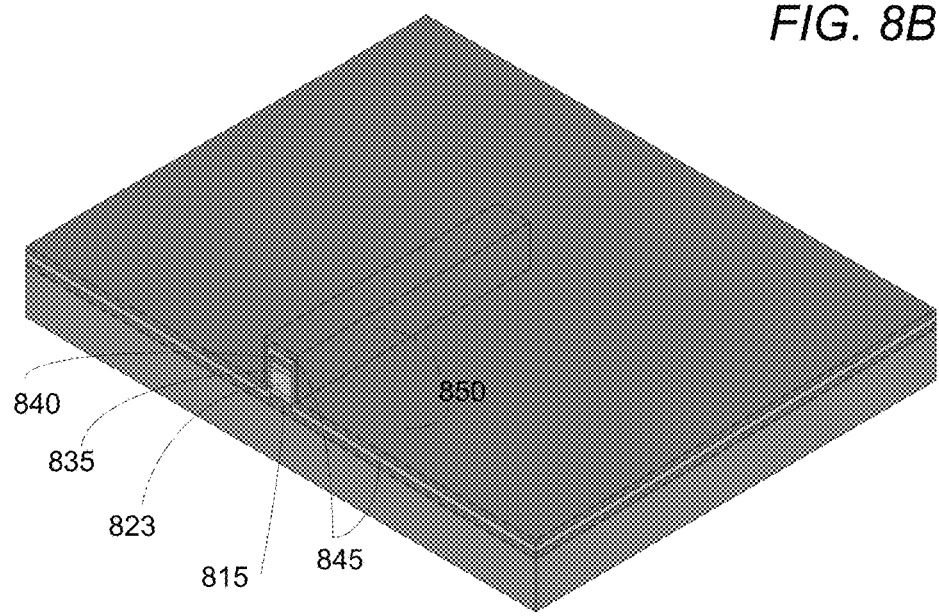
Figure 8C:
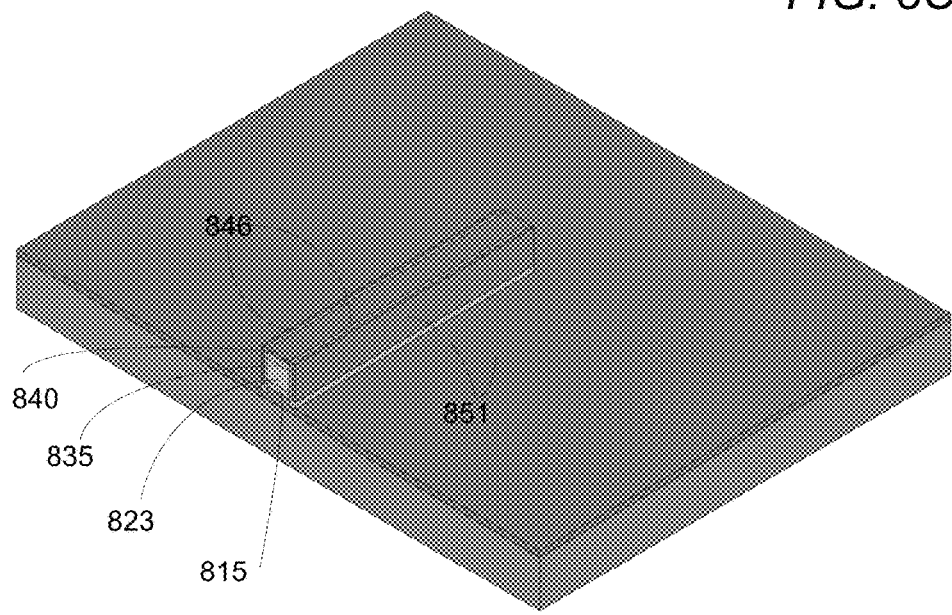
Figure 8D:
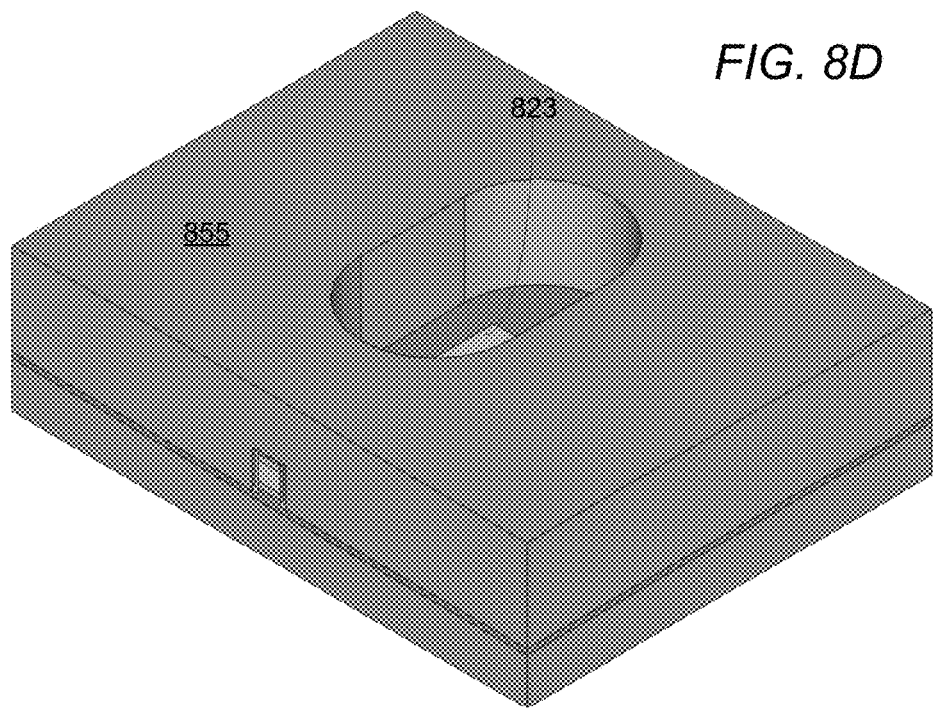
Figure 8E:
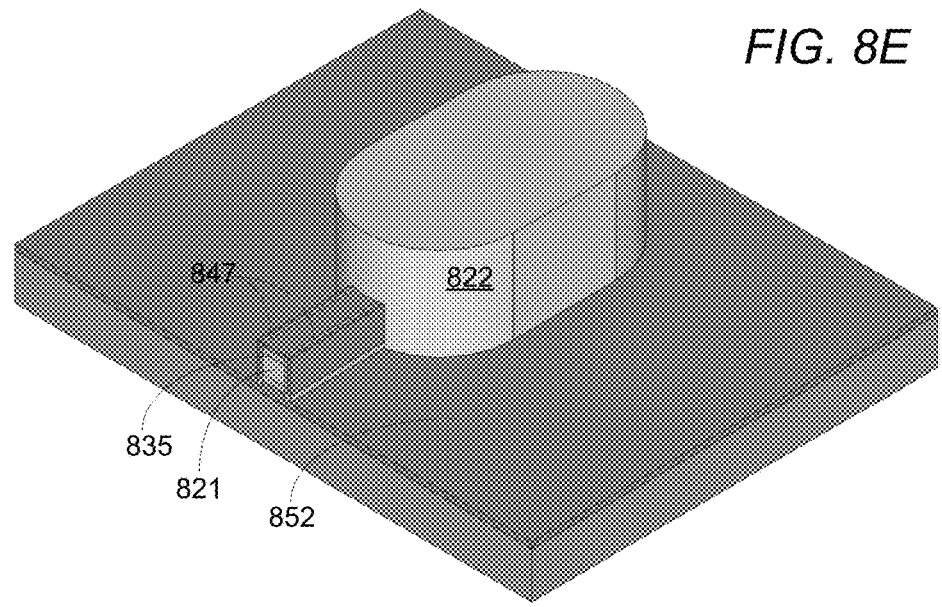
Figure 8F:
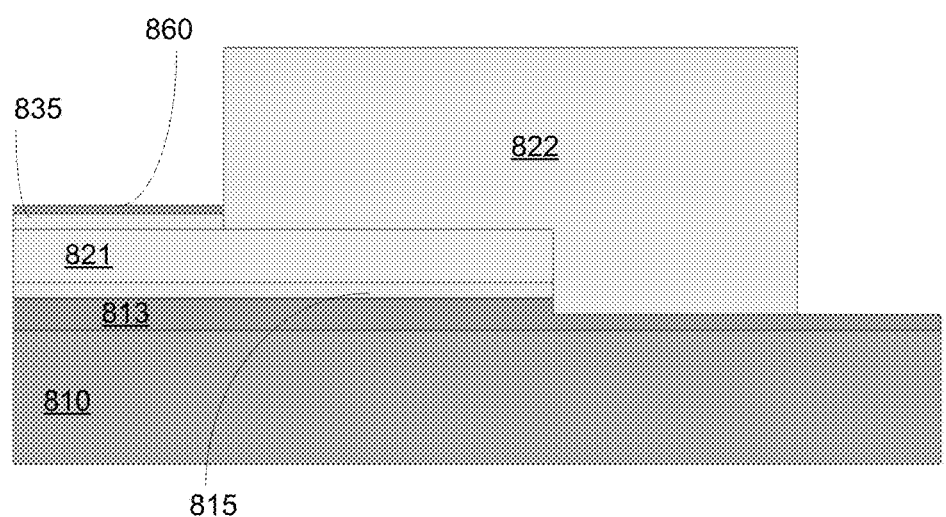

The illustrative process demonstrated in FIGS. 8A to 8F includes a two piece NFT, which implies that the disc and peg of the NFT are formed in different process steps. FIG. 8A shows the core 810, the CNS 813 that is made of a cladding material, a first surface (or bottom) adhesion layer 815, a rod 823 that eventually becomes part of the NFT, a top adhesion layer 835 thereon, and a capping layer 840. The rod can be formed by depositing a layer of plasmonic material (e.g., gold), patterning the layer with amorphous carbon hardmask, for example, and then milling. After the milling step, the amorphous carbon hardmask can be ashed away. The capping layer can be any material that can protect the top adhesion layer material from being oxidized in air or during subsequent patterning steps. An illustrative material for the capping layer includes, for example AlO. FIG. 8B shows the structure after the next step, which includes formation of an additional layer of adhesion material 845 and second capping layer 850 on top of the capping layer 840 so that the sides of the rod 826 are covered by adhesion layer material (the additional layer of adhesion material 845) and the adhesion layer 845 does not get damaged during subsequent processing (second capping layer 850). Next, the adhesion layer material in the field is removed with vertical ion milling to give the structure seen in FIG. 8C that includes the side adhesion layer 846 and remaining capping layer 851. The next step prepares the structure for formation of the disc and heat sink over the rod 823. This includes formation of patterned photoresist 855, which is shown in FIG. 8D. As seen in FIG. 8D, the adhesion layers 835 and 846 and the capping layer 851 around the peg inside the photo opening are milled away to expose the material of the rod. Then, finally the disc and heat sink are formed using a liftoff process and the patterned photoresist 855 seen in FIG. 8D is removed. This structure, including the peg 821 with adhesion layer 847 and partial capping layer 852 thereon, and the disc and heat sink 822 is seen in FIG. 8E. FIG. 8F shows the cross section that includes the core 810, the CNS 813, the lower adhesion layer 815, the peg 821, the disc and heat sink 822, the top adhesion layer 835 and the capping layer 860, which can ultimately form part of the top cladding or NPS space (NPS).

Referring back to FIGS. 3A and 3B, an adhesion layer can also be utilized on the air bearing surface 306 of the peg 305. Inclusion of an adhesion layer on the air bearing surface 306 can be in combination with an adhesion layer on any other surface(s) of the peg, and can be accomplished in combination with any disclosed processes or methods disclosed herein. In some embodiments, the deposition may be done selectively to cover the NFT region only in order to protect the magnetic pole and/or reader stack, etc, through various processes, including for example photoresist patterning at the ABS, selective area CVD or ALD deposition, Ion beam deposition (IBD), sputtering, electrodeposition, or any combination thereof. In some embodiments, a seed layer can also be included. The optional seed layer can include the same or different material as the adhesion layer. In embodiments where the NFT includes a primary and a second material, the primary and secondary material may mix together with the adhesion layer. As such, the adhesion layer may uniformly wrap the NFT from all sides of the peg, (e.g., the top, bottom, sides and the front of the peg).

Illustrative processes for forming disclosed adhesion layers can include for example, deposition methods such as chemical vapor deposition (CVD), physical vapor deposition (PVD), atomic layer deposition (ALD), plating (e.g., electroplating), sputtering methods, cathodic arc deposition methods, ion implantation method and evaporative methods. Conformality on the side walls of the peg may also be advantageous, so materials and processes that can produce high conformality may be advantageous. Various deposition techniques can be used to achieve in-situ and conformal sidewall films such as sputtering or 2PCM or IBD or CVD or ALD or evaporation or electro-deposition or area-selective CVD or area-selective ALD techniques.

Processes to form the adhesion layer could be easily integrated into the overall manufacturing process of the device. Overall, the use of disclosed adhesion layers would decrease or eliminate yield loss due to delamination of the NFT and contribute to increased NFT lifetime during the operation of the magnetic device with very little effect on current formation processes for the device.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including a near field transducer (NFT) and at least one associated adhesion layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
   a near field transducer (NFT), the NFT having a disc and a peg, and the peg having five surfaces thereof; and
   at least one adhesion layer positioned on at least one of the five surfaces of the peg, the adhesion layer comprising one or more of the following: chromium (Cr), tantalum (Ta), iridium (Ir), zirconium (Zr), yttrium (Y), scandium (Sc), cobalt (Co), silicon (Si), nickel (Ni), molybdenum (Mo), niobium (Nb), palladium (Pd), titanium (Ti), rhenium (Re), osmium (Os), platinum (Pt), aluminum (Al), ruthenium (Ru), rhodium (Rh), vanadium (V), germanium (Ge), tin (Sn), magnesium (Mg), iron (Fe), copper (Cu), tungsten (W), hafnium (Hf), carbon (C), boron (B), holmium (Ho), antimony (Sb), gallium (Ga), manganese (Mn), silver (Ag), indium (In), bismuth (Bi), zinc (Zn), ytterbium (Yb), combinations thereof.

2. The device according to claim 1, wherein the NFT comprises gold or an alloy thereof.

3. The device according to claim 1, wherein the at least one adhesion layer is located on a surface of the peg that is along an axis having a core of a waveguide and a write pole.

4. The device according to claim 3, wherein the at least one adhesion layer is located adjacent the core of the waveguide.

5. The device according to claim 3 further comprising at least one additional adhesion layer located on a surface of the peg that is perpendicular to the axis having the core and the write pole.

6. The device according to claim 1, wherein all surfaces of the peg except the air bearing surface have an adhesion layer thereon.

7. The device according to claim 1, wherein all five surfaces of the peg have an adhesion layer thereon.

8. The device according to claim 1, wherein the at least one adhesion layer has a thickness from about 1 to 60 Å.

9. A device comprising:
   an energy source;
   a near field transducer (NFT) configured to receive energy from the energy source, the NFT having a disc and a peg, and the peg having five surfaces thereof; and
   at least one adhesion layer positioned on at least one of the five surfaces of the peg, the adhesion layer having a thickness from about 10 Å to about 35 Å, and the adhesion layer comprising one or more of the following: boron (B), aluminum (Al), indium (In), or combinations thereof.

10. The device according to claim 9, wherein the at least one adhesion layer has a thickness from about 10 Å to about 30 Å.

11. The device according to claim 9, wherein the at least one adhesion layer has a thickness from about 2 Å to about 30 Å.

12. The device according to claim 9, wherein the NFT comprises gold or an alloy thereof.

13. The device according to claim 9, wherein the NFT comprises silver (Ag) or an alloy thereof.

14. The device according to claim 9, wherein the NFT comprises copper (Cu) or alloys thereof.

15. The device according to claim 9, wherein the energy source comprises a laser.

16. The device according to claim 9 further comprising a waveguide, the waveguide configured to receive the energy from the energy source and couple it into the NFT.

17. The device according to claim 16, wherein the at least one adhesion layer is located on a surface of the peg that is along an axis having the core of the waveguide.

18. The device according to claim 17, wherein the at least one adhesion layer is located adjacent the core of the waveguide.

19. A method comprising:
   forming a structure, the structure comprising:
      a bottom adhesion layer;
      a peg and disc structure on the bottom adhesion layer, the peg and disc structure having both top surfaces and side surfaces;
      a second adhesion layer on the top and side surfaces of the peg and disc structure;
      a capping layer on the second adhesion layer; and
      an amorphous carbon layer on the capping layer; and
   removing at least a portion of the second adhesion layer via vertical ion milling and chemical mechanical polishing wherein the amorphous carbon layer functions as a stop layer for the second adhesion layer.

* * * * *